F. A. WARDWELL.
LOOM PICKER WINDING MACHINE.
APPLICATION FILED MAY 28, 1915.

1,189,412.

Patented July 4, 1916.
4 SHEETS—SHEET 1.

Witness:
H. B. Davis.

Inventor:
Frank A. Wardwell
by Rogers & Harriman
Atty's

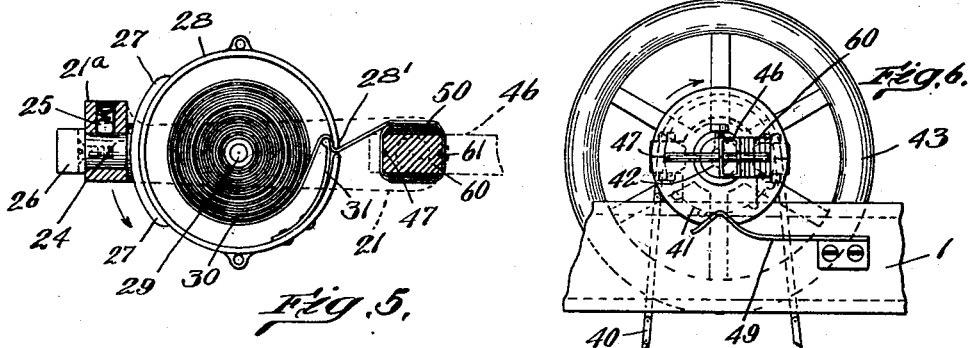
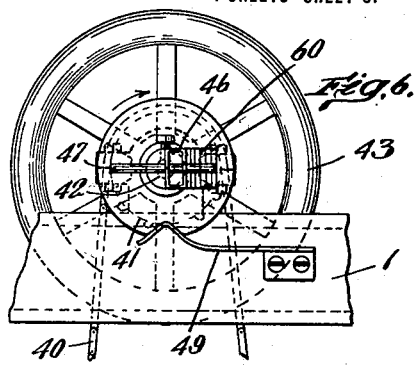
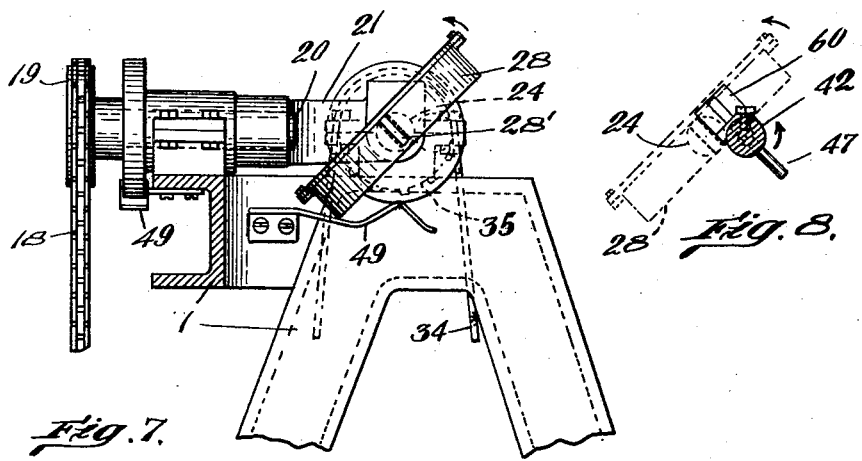
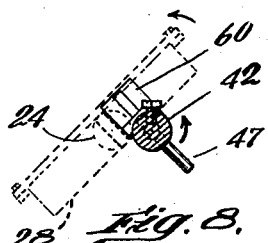
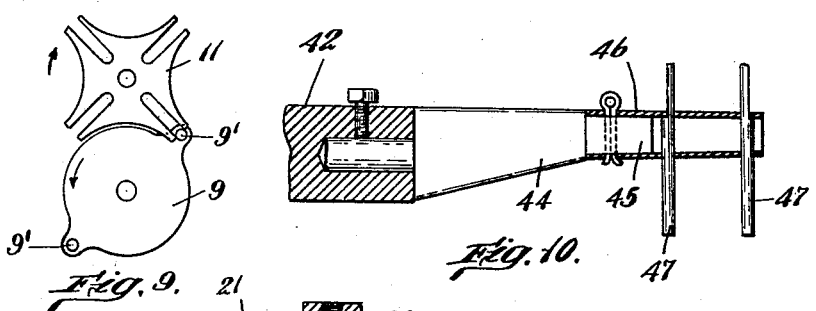
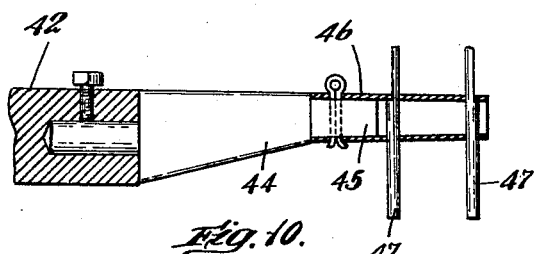
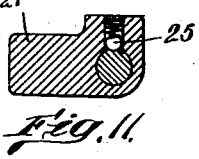

F. A. WARDWELL.
LOOM PICKER WINDING MACHINE.
APPLICATION FILED MAY 28, 1915.
1,189,412. Patented July 4, 1916.
4 SHEETS—SHEET 4.
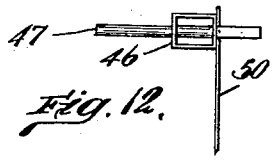 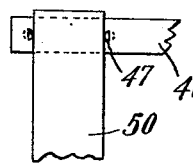 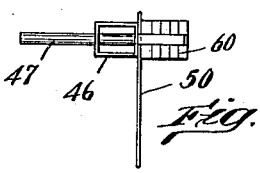
Fig. 12.  Fig. 13.  Fig. 14.
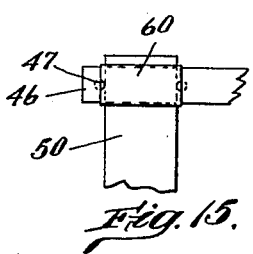 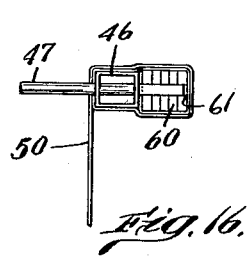 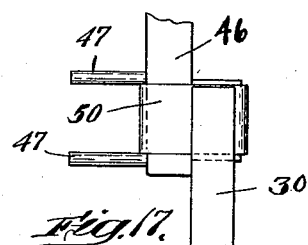
Fig. 15.  Fig. 16.  Fig. 17.
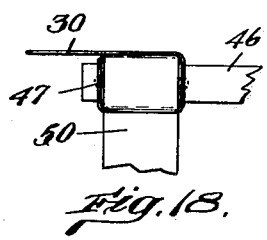 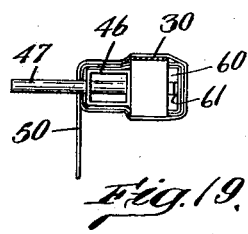 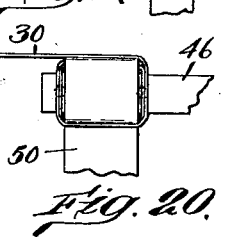
Fig. 18.  Fig. 19.  Fig. 20.
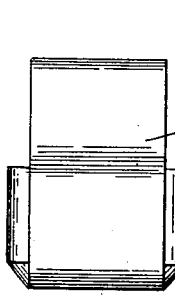 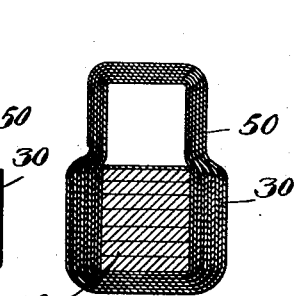 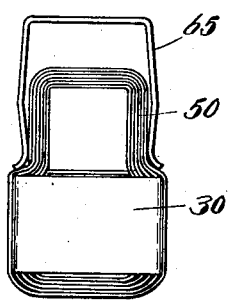
Fig. 21.  Fig. 22.  Fig. 23.
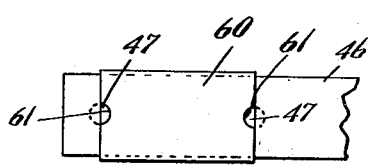
Fig. 24.
Witness:
H. B. Davis.
Inventor:
Frank A. Wardwell
by Roy H. Hamman
attys.

UNITED STATES PATENT OFFICE.

FRANK A. WARDWELL, OF METHUEN, MASSACHUSETTS.

LOOM PICKER-WINDING MACHINE.

1,189,412.  Specification of Letters Patent.  Patented July 4, 1916.

Application filed May 28, 1915. Serial No. 31,058.

*To all whom it may concern:*

Be it known that I, FRANK A. WARDWELL, a citizen of the United States, residing at Methuen, in the county of Essex and State of Massachusetts, have invented an Improvement in Loom Picker-Winding Machines, of which the following is a specification.

The object of my invention is to provide a machine for making the loom picker, shown in my Patent #625,520, dated May 23, 1899. The loom picker of my said patent comprises a core which may be composed of sheets of leather, rubber, cork, or other suitable material, which is protected by and attached to the picker stick by a strip of textile material wound thereabout, the windings of said strip being alternated with the windings of a second strip which is passed about the core at right angles thereto. While the device of my said prior patent, when properly constructed, is highly advantageous, it has not gone into general use, on account of the fact that, with the appliances which were available for making said devices, which practically amounted to hand-methods, it was not only difficult to make them so that they were satisfactory, but it was also practically impossible to make them at a cost which would enable them to be sold at a sufficiently low price to compete with other devices for the same purpose already on the market.

A more specific object of my invention, therefore, is to produce a machine on which the device of my said prior patent may be automatically wound, so that the winding operation may be performed at small expense, and the tape may be drawn more tightly about the core, than was possible with the hand-methods previously employed, so that the resulting device will be solid and compact.

I accomplish these objects by the means shown in the accompanying drawings, in which:—

Figure 1:
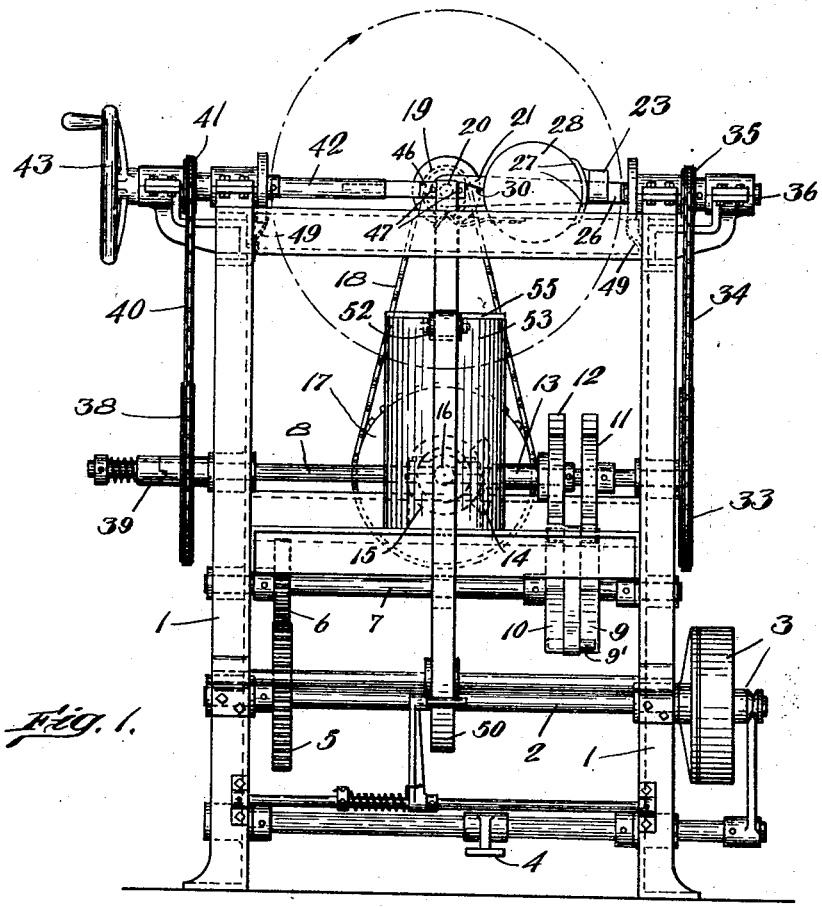
Figure 2:
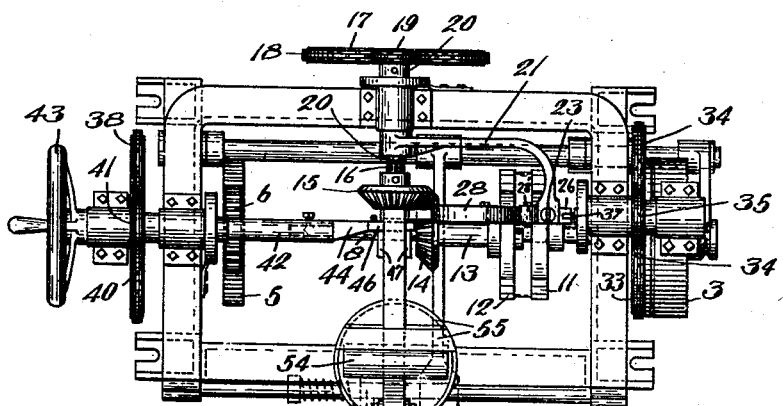
Figure 3:
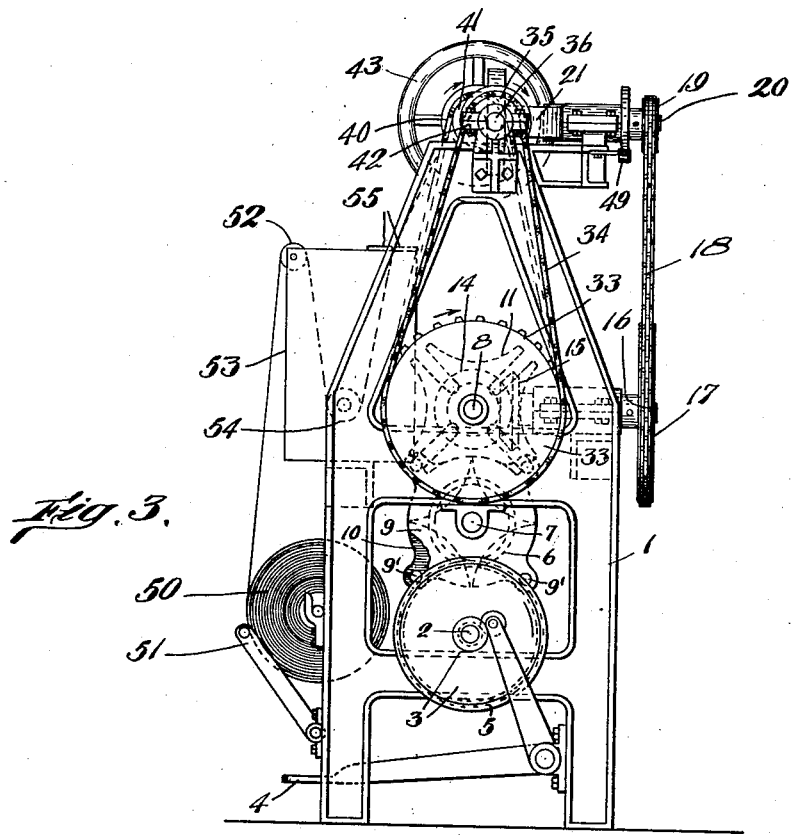
Figure 4:
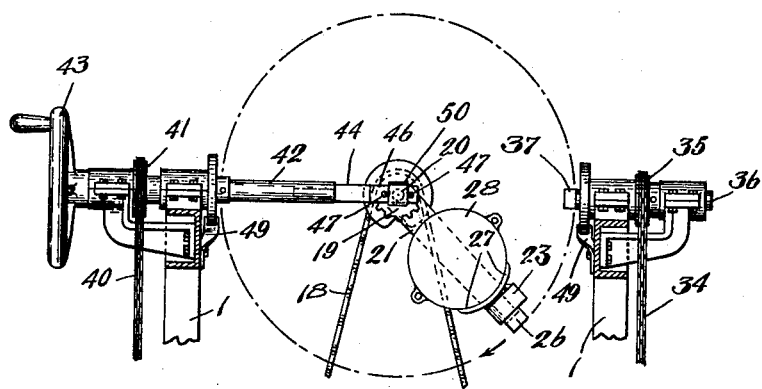

Figure 1 is a front elevation and Fig. 2 a side view of a winding machine embodying my invention. Fig. 3 is an end view thereof. Fig. 4 is a detail view, in front elevation, of the winding-mechanism and showing the parts in a different position from that of Fig. 1. Fig. 5 is a detail view of the binding-tape holder. Fig. 6 is a detail view of one of the winding shafts. Fig. 7 is a detail view of the other winding shaft. Fig. 8 is a detail view showing the axial relation of the winding shaft and tape-carrier shaft. Fig. 9 is a detail view of a form of intermittent driving-mechanism which I preferably employ. Fig. 10 is a detail view of the winding-spindle. Fig. 11 is a detail view of the ball-friction device. Figs. 12 to 20 are detail views showing different steps in the winding operation. Figs. 21 to 23 are, respectively, side, sectional, and end views of the finished picker. Fig. 24 is a detail view of the picker core.

To explain briefly the operation to be performed, it may be stated that a strip of freshly cemented binding tape is first to be wound several times about the picker core, and an arbor on which it is supported, after which alternate turns of an adhesive anchoring tape and of the binding tape are to be wound about the core at right angles to each other, until the operation is finished. The machine which I preferably employ for this purpose, comprises a main frame 1, having a main shaft 2 therein, on which a clutch 3 is mounted, to which the power is applied, said clutch being operated by a treadle 4, and provided with automatic throw-off mechanism, so that, when the treadle is depressed, the shaft 2 will make a complete rotation, and then automatically come to rest. Inasmuch as devices which will accomplish this result are well known in the art, it is deemed to be unnecessary to refer to this clutch mechanism, except in a general way.

The shaft 2 is provided with a gear 5 arranged diametrically opposite each other, also mounted in the frame, the relative sizes of the gears being such that a complete rotation of the shaft 2 will cause two complete rotations of the shaft 7. A shaft 8 is mounted in the frame above the shaft 7, and is actuated intermittently thereby through what is commonly known as a Geneva motion, the form of which is shown in detail in Fig. 9. The actuating-member 9 of this motion is mounted on the shaft 7 and is provided with a pair of projecting-pins 9', arranged diametrically opposite each other, each pin being adapted to enter the radial slots of an actuated member 11, secured on the shaft 8. A second actuating member 10 of an identical device is also mounted on shaft 7, and is arranged to engage an actuated member 12, mounted on a sleeve 13, which is freely rotatable on shaft 8. The pins of the member 10 are arranged 90° from those of member 9, so that one of them operates on each quarter turn of the shaft 7.

A beveled gear 14 is mounted on the end of the sleeve 13, and said gear is arranged in mesh with a gear 15 mounted on a shaft 16, held at right angles to the shaft 8. A sprocket-wheel 17 is mounted on the shaft 16, and a chain 18 passes about said sprocket, and about a sprocket 19 mounted on a shaft 20, journaled in the upper portion of the frame. A right-angularly shaped arm 21 is mounted on the shaft 20, and extends at right angles thereto and then longitudinally thereof, as shown in Fig. 2, and has a bearing 23 in its end in which a shaft 24 is journaled to rotate about an axis which extends at right angles to the axis of the shaft 20. A ball-friction device 25, shown in detail in Fig. 11, is mounted in the arm 21 in position frictionally to engage the shaft 24, and to hold it in a certain position, except when positively actuated. The shaft 24 is provided at one end with a pair of transversely extending fingers 27, to which a circular casing 28 is attached, said casing being similar, in some respects, to a well-known form of bobbin casing, and being provided with a central pin 29 on which a roll of tape or ribbon 30 may be mounted, as best shown in Fig. 5. An opening 28' is formed in one side of the casing 28, which may be termed a tape carrier, diametrically opposite from the shaft 24, and a tension device 31 is mounted on the inner side thereof, so that, as the tape 30 is drawn through the opening, a certain amount of tension will be applied thereto.

A sprocket 33 is mounted on the right-hand end of the shaft 8, and a chain 34 passes about said sprocket, and about a sprocket 35 mounted on a shaft 36, which extends parallel to the shaft 8, and is also in axial alinement with shaft 24, when the latter is held in the normal position of Figs. 1 and 2. Said shaft 36 is provided, at its inner end, with a flat tongue 37, which is normally held in a vertical position and is adapted to fit into a correspondingly shaped socket formed in the adjacent end of the shaft 24, so that said shafts may rotate in unison.

A sprocket 38 is rotatably mounted on the shaft 8 and is connected thereto by a clutch device 39, which is so arranged that, when the shaft 8 is driven, the sprocket 38 will be driven therewith, this arrangement permitting the sprocket 38 to be rotated forward while the shaft 8 is held stationary. A chain 40 passes about the sprocket 38 and about a sprocket 41 on a shaft 42, mounted in the frame, said shaft 42 being arranged to rotate about an axis which is parallel to, but slightly to one side of a position which would be in exact alinement with the axis of the shaft 36, as shown in Fig. 8. A hand-wheel 43 is mounted on the shaft 42 to permit the shaft 42 to be conveniently rotated forwardly by hand.

A socket is formed in the inner end of the shaft 42, which is adapted to receive and securely hold a spindle or holder 44. The spindle 44 is provided with a squared end portion 45 onto which a metal tube or arbor 46 is adapted to be placed and secured, said tube being of similar size and shape to the upper end of a loom picker stick. A pair of pins 47 are adapted to be inserted in corresponding apertures in the arbor 46 in parallel relation and at right angles thereto, said pins being formed to project beyond the arbor 46 at each side thereof, the projecting portions of the pins at one side of the arbor being flattened at their opposite sides, so that they are practically semi-circular in cross section.

Suitable friction locking springs 49, are provided on each of the shafts 20, 36, and 42, which are adapted to hold said shafts in their respective initial positions, except when positively driven.

A roll of textile material, or tape 50 is mounted in the lower portion of the machine frame, and a tension device 51 is arranged to engage said roll, so that a suitable amount of force will be required to unwind the tape therefrom. The tape 50 is extended upward from the roll over an idler 52 mounted on a cement tank 53, and then downwardly about another idler 54, within the tank, and then upwardly through a doctor 55, for removing the surplus cement therefrom. The width of the tape 50 is substantially greater than that of the tape 30.

In carrying out the winding operation, the arbor 46, having the supporting pins 47 mounted therein, is secured on the end of the shaft 44, as shown in Fig. 10. The picker core 60, which may be made of any suitable resilient material, as before stated, is provided, opposite sides of which have semi-circularly shaped grooves 61, see Fig. 24, therein, arranged to receive the rounded sides of the pins 47, and to be tightly fitted therebetween, so that it will be securely held in position to project laterally from the arbor, as shown in Figs. 5, 14, and 16, the flat sides of the pins 47 being flush with the sides of the core. The end of the tape 50 is then inserted between the core and the arbor, and clamped therebetween, as shown in Figs. 12 to 14, and then the shaft 42 is caused to make (preferably) two rotations by means of the hand wheel 43, while the tape is thus held, so that two turns of the tape will be wound about the core, as shown in Figs. 15 and 16. When the shaft has been rotated slightly beyond a complete turn, so that the portion of the tape being wound onto the core is brought to bear against the portion already wound thereon, the tape will be securely locked, enabling the tape to be wound tightly against the tension which is placed thereon. It will be noted that rotation of the shaft 42 is accomplished without rotating the other parts of the machine as the clutch 39 permits independent rotation of said shaft. The tape 30 in the carrier 28 is coated with material which causes it to adhere to itself, and, after the several turns about the core have been made, with the tape 50, said tape 30 is drawn from the carrier and the end thereof is laid beneath the tape 50, as shown in Fig. 17, so that the end of the tape 30 will be secured in this position. The treadle 4 is then depressed and the machine is started, the following operations taking place:—One of the pins of the actuating-member 10 engages the member 12 which is mounted on the sleeve 13, and causes ¼ of a complete rotation thereof. The relative sizes of the sprockets 17, 19, are such that this ¼-turn of the sprocket 17 causes a complete rotation of the sprocket 19, and therefore of the shaft 20 on which it is mounted, so that the arm 21 thereon is swung downwardly, as shown in Fig. 4, carrying the slotted end of the shaft 24 out of engagement with the tongue 37 on the end of the shaft 36, and causing the carrier 28 to make a complete revolution about the axis of the shaft 20, and in a vertical plane parallel to the axis of shaft 42, as indicated by the dotted line in said Fig. 4, and returning it to the initial position of Fig. 1, at which time, the friction device on the shaft 20 will come into operation and lock the same in this position. As the shaft 24 is returned to its initial position, it will again be connected to the shaft 36, its slotted end portion passing at opposite sides of the tongue 37 of shaft 36, said tongue being held, during the entire revolution of the tape carrier 28, in the plane of revolution thereof, so that ready disconnection and connection of the shafts 36 and 24 is permitted. This movement of the carrier 28 causes the tape 30 to be drawn therefrom and wound about the core 60 onto and at right angles to the previous windings of the tape 50, as shown in Fig. 17, the middle transverse line of the core lying in the plane of revolution of the center of the carrier. As the shaft 20 comes to rest in its initial position, one of the pins of the actuating-member 9 will engage the member 11 of the Geneva motion, and cause ¼ turn of the shaft 8. The relative sizes of the sprockets 38 and 41 are such that this ¼ turn of the shaft 8 will cause a complete rotation of the shaft 42, and, in making this rotation, an additional turn of the tape 50 will be wound upon the core in a manner similar to that already performed by rotating the shaft 42 by hand. At the same time, the sprocket 33, acting through the chain 34 upon the sprocket 35, will also cause the shaft 36 to make a complete rotation in the same direction. This motion is transmitted to the shaft 24, which bears the carrier 28, and causes the latter to make a single lateral rotation, as indicated in Fig. 7. The purpose of this rotation of the carrier 28 is to prevent the twisting of the tape 30 which runs therefrom to the core, which would, otherwise, occur by reason of the rotation of the core to which it is attached. The above-described operations are then alternately repeated, the shaft 20 being first rotated, so as to wind the anchoring tape 30 about the machine, and then the shafts 42 and 36 being rotated to wind the binding-tape 50 about the core at right angles thereto, and to prevent the formation of a resulting twist in the anchoring tape 30, this operation being automatically continued until four turns of each tape have been wound about the core, after which, the machine comes to rest by the operation of the main clutch mechanism. After the operation is finished, the tapes are cut close to the core, and the arbor 46 is removed from the holder 44.

While the core is of the same thickness as the arbor 46, on account of the additional transverse windings of the tape 30, thereabout, and consequent increased thickness of the windings at this point, the turns of the tape 50 after the first two, will be drawn obliquely from the core to the arbor, and these portions of the tape 50 will be held out of contact with the portions directly beneath. To overcome this difficulty and to press such portions into firm contact and thereby form a solid, compact device, a spring clip 65 is then placed on the loop portion of the picker and pressed firmly against the shoulder formed by the transverse windings, as shown in Fig. 23, with the result that the layers are firmly pressed together at this point. The cement with which the tape is saturated is then permitted to become thoroughly dry, while thus held.

The pins 47 may be removed from the arbor as soon as the winding operation is finished, as their main function is to hold the core in position while the winding operation is being performed, although they serve a minor function in that they act to guide the tape 50 as it is wound thereon. When the pins have been removed, and the picker has become thoroughly dry, the latter may be readily removed from the arbor, and will then be ready for use.

The above-described winding operation may thus be rapidly performed, the tapes being tightly drawn about the core, so that a very satisfactory and serviceable loom picker may be produced at a low cost.

While the above-described machine is adapted to a certain number of turns of tape on the core, it will be apparent that, by making obvious changes in the power-transmitting mechanism, the number of turns may be increased or reduced, as desired.

I claim:—

1. A machine for the purpose described comprising a picker-core-holder, winding means to wind a strip of tape in one direction about a core held on the holder, a second winding means to wind another strip of tape about the core in a direction which is transverse to the windings of the first-named strip, and means to operate said winding means alternately.

2. A machine for the purpose described comprising a picker-core-holder, formed to correspond to the picker-arm of a loom and arranged to support the core at one side thereof, means to wind a strip of flexible material about the core and the holder, means to wind an anchoring strip of similar material about the core at approximately right angles to the windings of the other strip and automatic means to operate the winding means of each strip successively.

3. A machine for the purpose described, comprising a picker-core-holder, means to rotate said holder to wind a tape about the core in one direction and means to wind another tape about the core in a transverse direction while the holder is held stationary.

4. A machine for the purpose described, comprising an arbor having means to support a picker-core at one side thereof, means to rotate said arbor to wind a strip of tape about the core and the arbor, transversely of the axis thereof and means to wind a second strip about the core in a longitudinal direction with relation to said axis.

5. A machine for the purpose described, comprising an arbor having means to support a picker-core at one side thereof, means to rotate said arbor and to hold it at rest, intermittently, a tape-carrier and means to revolve the same about said core longitudinally of the axis of the arbor while the latter is held stationary.

6. A machine for the purpose described, comprising a rotatably mounted arbor, means to support a picker-core thereon in a position to project transversely therefrom, a tape-carrier mounted to revolve about the core in a plane approximately at right angles to the plane of revolution of the core and means to rotate the arbor and revolve the carrier alternately.

7. A machine for the purpose described, comprising a rotatably mounted arbor, means to support a picker-core thereon in a position to project transversely therefrom, a tape-carrier mounted to revolve about the core in a plane approximately at right angles to the plane of revolution of the core, and power-actuated means operating alternately to rotate said arbor and revolve said carrier intermittently.

8. A machine for the purpose described, comprising a rotatably mounted arbor, means to support a picker-core thereon in a position to project transversely therefrom, a tape-carrier mounted to revolve about the core in a plane approximately at right angles to the plane of revolution of the core, power-actuated means alternately to rotate said arbor and revolve said carrier intermittently, and means permitting said arbor to be rotated independently of said power-actuated means.

9. A machine for the purpose described, comprising a rotatably mounted arbor, means to support a picker-core thereon in a position to project transversely therefrom, means to cause intermittent rotation of said arbor and to hold it at rest with said core in a predetermined position, a tape-carrier mounted to revolve about the core, when in said position, in a plane extending approximately parallel to the axis of said arbor, and means to cause the revolutions of said carrier and rotations of said arbor to be alternated.

10. A machine for the purpose described, comprising a picker-core-support, means to rotate said support to wind a tape about a picker-core thereon, in one direction, a tape-carrier and means to revolve said carrier about said core to wind a tape delivered thereby onto the core transversely of said direction, and automatic means for controlling the rotating means of said support and the revolving means of said carrier to operate alternately.

11. A machine for the purpose described, comprising a picker-core-support, means to rotate said support to wind a tape about a picker-core thereon, in one direction, a tape-carrier and means to revolve said carrier about said core to wind a tape delivered therefrom onto the core transversely of said direction, means to cause alternate rotation of said support and revolution of said carrier, and means permitting rotation of said carrier in the direction of rotation of said support.

12. A machine for the purpose described, comprising a picker-core-support, means to rotate said support to wind a tape about a picker-core thereon, in one direction, a tape-carrier and means to revolve said carrier about said core to wind a tape delivered therefrom onto the core transversely of said direction, means to cause alternate rotation of said support and revolution of said carrier, and means to cause rotation of said carrier in the direction of rotation of said support.

13. A machine for the purpose described, comprising a picker-core-support, means to rotate said support to wind a tape about a picker-core thereon, in one direction, a tape-carrier and means to revolve said carrier about said core to wind a tape therefrom onto the core transversely of said direction, means to cause alternate rotation of said support and revolution of said carrier, and means to cause rotation of said carrier in the direction of rotation of said support between the periods of its revolution.

14. A machine for the purpose described, comprising a picker-core-support, means to rotate said support to wind a tape about a picker-core thereon, in one direction, a tape-carrier and means to revolve said carrier about said core to wind a tape therefrom onto the core transversely of said direction, means to cause alternate rotation of said support and revolution of said carrier, and means to cause rotation of said carrier simultaneously with the rotation of said support and in the direction of rotation of the latter.

15. A machine for the purpose described, comprising a picker-core-support, means to rotate said support to wind a tape about a picker-core thereon, in one direction, a tape-carrier and means to revolve said carrier about said core to wind a tape therefrom onto the core transversely of said direction, means to cause alternate rotation of said support and revolution of said carrier, means permitting rotation of said carrier in the direction of rotation of said support and a shaft arranged to engage the carrier and rotate the same in said direction during the rotational movement of said support, and to become disengaged therefrom during its revolving movement.

16. A machine for the purpose described, comprising an arbor, means to support a picker-core thereon and to rotate the same to wind a tape about the core in one direction, a shaft, having an arm thereon, and rotatable about an axis at right angles to the axis of the arbor, a tape-carrier mounted in said arm to rotate about an axis at right angles to the axis of said shaft, means to rotate said shaft to revolve said carrier about the core to wind the tape thereon transversely of said direction, automatic means to cause alternate single rotations of said arbor and said shaft, means to hold said arbor and said shaft in predetermined initial positions during the rotation of the other, and means to cause rotation of the carrier with the arbor while said shaft is at rest.

17. A machine for the purpose described, comprising an arbor, means to support a picker-core thereon, and to rotate the same to wind a tape about the core in one direction, a shaft, having an arm thereon, and rotatable about an axis at right angles to the axis of the arbor, a tape-carrier mounted in said arm to rotate about an axis at right angles to the axis of said shaft, means to rotate said shaft to revolve said carrier about the core, to wind the tape thereon transversely of said direction, automatic means to cause alternate single rotations of said arbor and said shaft, means to hold said arbor and said shaft in predetermined initial positions during the rotation of the other, and actuating-means arranged to engage said carrier when in its said initial position to cause rotation of said carrier in said arm simultaneously with the rotation of said arbor and to become disengaged therefrom during the revolving movement of the carrier.

18. A machine for the purpose described, comprising an arbor having transversely disposed supports for holding a picker-core on one side thereof, and means to wind a strip of tape about said core and armor transversely of the arbor and another strip about said core longitudinally of the arbor, said core-supporting-means being arranged to permit removal of the core from the arbor at the end of the winding operation.

19. A machine for the purpose described, comprising an arbor, a pair of pins removably mounted therein at right angles thereto, and arranged to receive a picker-core therebetween to support the same on the arbor, and means to wind a tape about said core while thus supported.

20. A machine for the purpose described, comprising an arbor, a pair of pins mounted therein at right angles thereto, and arranged removably to support a picker-core therebetween, and means to wind a tape about the core while thus supported.

21. A machine for the purpose described, comprising a rotatable support having means to hold a picker-core thereon in transverse relation to the axis thereof, a tape-carrier comprising a casing having a tape-roll-containing chamber, means on said casing for applying tension to the tape as it is withdrawn from said chamber, and means to carry said casing about a core on said support in a plane of revolution approximately parallel to the axis of said support.

22. A machine for the purpose described, comprising a rotatable support having means to hold a picker-core thereon in transverse relation to the axis thereof, a revolubly mounted arm having a tape-carrier journaled therein to rotate about an axis transverse to the axis of the arm and arranged to be carried by said arm about a core on said support in a plane of revolution approximately parallel to the axis of said support, means to hold said carrier in a predetermined position with relation to said arm during a revolving movement thereof, means to hold said arm at rest during a rotation of said support and means to rotate said carrier in the arm while said arm is in said position of rest.

23. A machine for the purpose described, comprising a rotatable support having means to hold a picker-core thereon in transverse relation to the axis thereof, a revolubly mounted arm having a tape-carrier journaled therein to rotate about an axis transverse to the axis of the arm and arranged to be carried by said arm about a core on said support in a plane of revolution approximately parallel to the axis of said support, means to hold said carrier in a predetermined position with relation to said arm during a revolving movement thereof, means to hold said arm at rest during a rotation of said support, a shaft arranged to be engaged by said carrier when said arm is moved into its position of rest and to be disengaged therefrom when moved from said position, and means to rotate said shaft, to rotate said carrier, when in engaged position, in the direction of rotation of said support.

24. A machine for the purpose described comprising a winding arbor having means to support a picker-core thereon, means to deliver a strip of tape under tension to said arbor in position to be wound about the arbor and a core thereon, when the arbor is rotated, a tape-carrier and means to revolve said carrier about the core in a plane transverse to the plane of revolution of the core and to deliver a strip of tape under tension as it is rotated, and means to cause alternate intermittent rotations of said arbor and revolutions of said carrier.

25. A machine for the purpose described, comprising a winding arbor, having means to support a picker-core thereon, means to deliver a strip of tape under tension to said arbor in position to be wound about the arbor and a core thereon, when the arbor is rotated, means to hold said arbor at rest in a predetermined position, a tape-carrier having means to deliver a strip of tape under tension, and means to revolve said carrier about the core, when held at rest by the arbor, to wind the tape delivered thereby onto the core transversely of the windings about the arbor.

In testimony whereof I have signed my name to this specification.

FRANK A. WARDWELL.

Witness:
L. H. HARRIMAN.

Copies of this patent may be obtained for five cents each, by addressing the "Commissioner of Patents. Washington, D. C."